W. A. DAWSON.
RESILIENT AUTOMOBILE WHEEL.
APPLICATION FILED MAR. 13, 1913. RENEWED JULY 20, 1914.
1,130,891.
Patented Mar. 9, 1915.
2 SHEETS—SHEET 2.
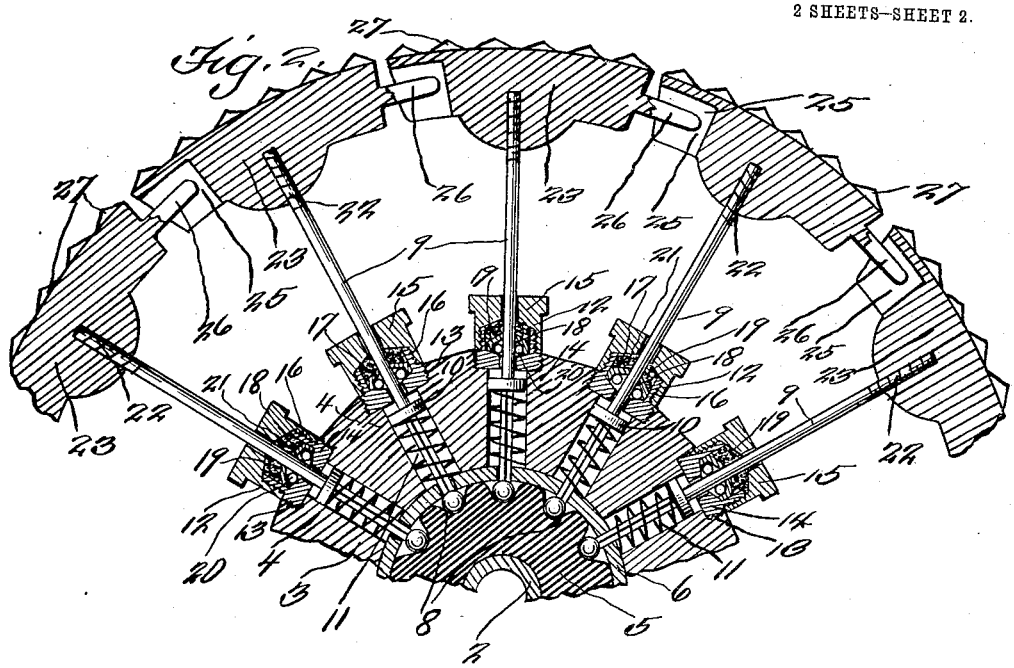
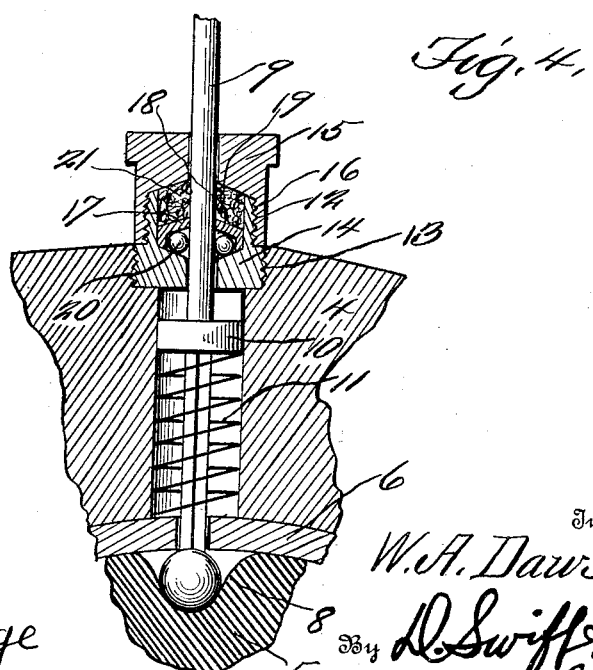
Witnesses
Mark De Grauge
Francis T. Foxwell
Inventor
W. A. Dawson,
By D. Swift & Co.,
his Attorneys

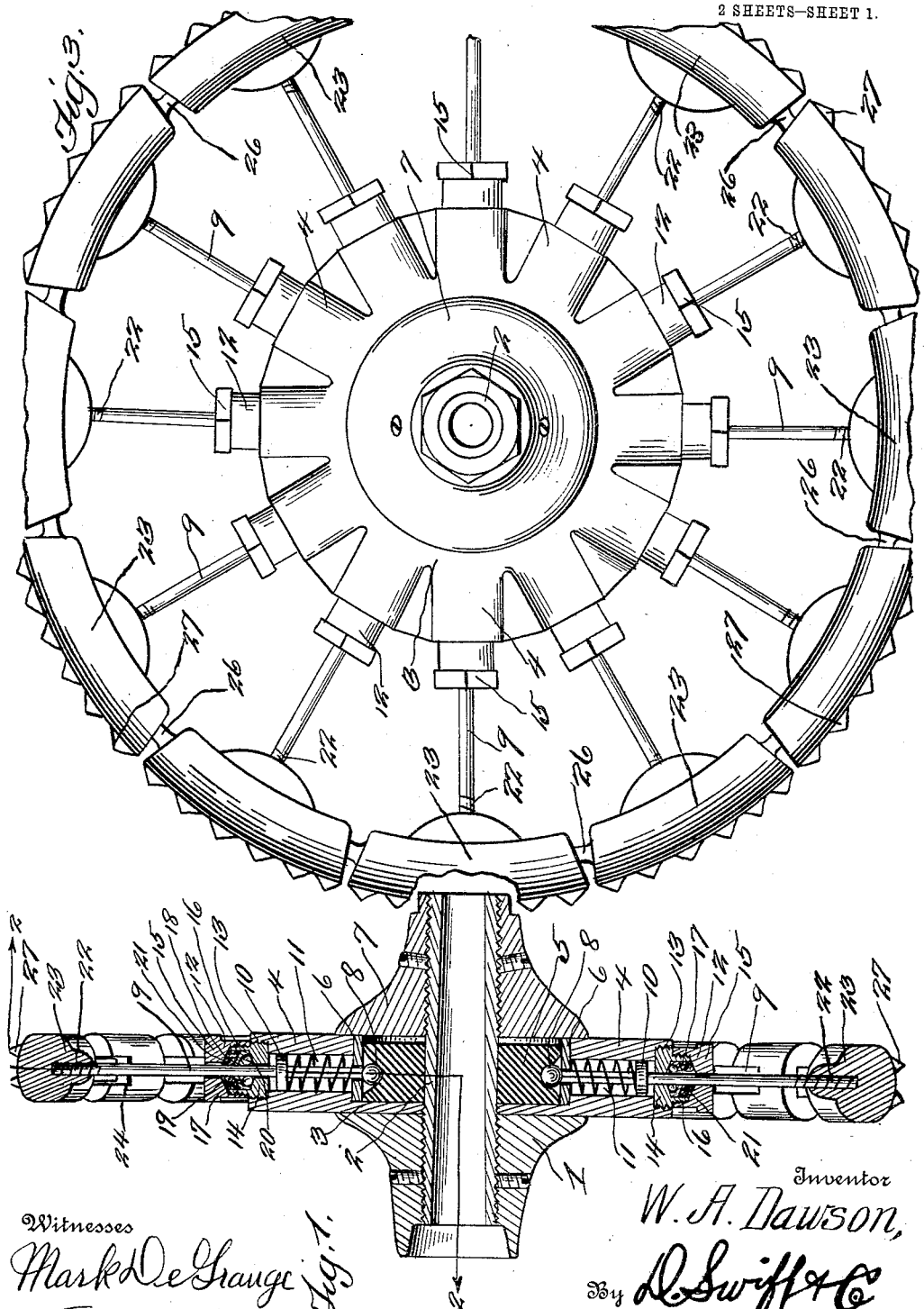

UNITED STATES PATENT OFFICE.

WILLIAM A. DAWSON, OF DELTA, COLORADO.

RESILIENT AUTOMOBILE-WHEEL.

1,130,891. Specification of Letters Patent. Patented Mar. 9, 1915.

Application filed March 13, 1913, Serial No. 754,071. Renewed July 20, 1914. Serial No. 852,086.

*To all whom it may concern:*

Be it known that I, WILLIAM A. DAWSON, a citizen of the United States, residing at Delta, in the county of Delta and State of Colorado, have invented a new and useful Resilient Automobile-Wheel; and I do hereby declare the following to be a full, clear, and exact description of the invention, such as will enable others skilled in the art to which it appertains to make and use the same.

This invention relates to a new and useful resilient automobile wheel, and one in which the resiliency is interposed between the spokes and the inner skein or sleeve of the hub of the wheel.

As one of the objects of the invention, there is provided an inner rubber disk having a series of sockets to receive the solid rubber balls of the inner ends of the rod spokes, thus allowing the rod spokes to yield.

An object of the invention is to construct the rim of the wheel of a plurality of sections, joined together in sequence by loose slip joints as shown in the drawings. Each section of the tire is carried by a rod spoke.

Another object of the invention is the provision of a metallic band surrounding the rubber plate, between which and the shoulders on the rod spokes, springs are interposed, to further insure resiliency.

One of the features of the invention is the provision of tubular members or sheaths surrounding the springs, and into which two part members having packing and ball bearings are threaded; said two part members with the packing therein, not only acting to exclude the dust and the like, but also owing to the lubrication in the packing and the ball bearings constituting means to allow the spokes to reciprocate easily, as the sections of the tire come in contact with the ground.

The invention comprises further features and combination of parts, as hereinafter set forth, shown in the drawings and claimed.

In the drawings:—Figure 1 is a vertical sectional view through the improved wheel construction in accordance with the invention. Fig. 2 is a sectional view on line 2—2 of Fig. 1. Fig. 3 is a side elevation of the improved wheel. Fig. 4 is a detail view of one of the two part members.

Referring more particularly to the drawings, 1 designates the inner member of the hub portion of the wheel. This inner member is provided with a sleeve or skein 2, which passes through a plate 3, the outer portion of which is supplied with a series of tubular members or sheaths 4. The plate 3 is recessed on one side thereof to receive the rubber disk 5, between which and the inner end of the tubular members or sheaths 4 an annular metal band 6 is provided. The sleeve or skein 2 also passes through the rubber disk 5, and is threaded into the other member 7 of the hub. The rubber disk 5 is provided with a series of sockets 8, to receive the rubber balls fixed to the inner ends of the rod spokes 9 of the wheel. The rod spokes 9 where they pass through the metal band 6 are constructed rectangular in cross section, to prevent them from turning. Constructed upon the rod spokes are integral collars 10 forming shoulders, between which and the metal band 6 coil springs 11 are interposed. The coil springs 11 are located in the tubular members or sheaths 4.

In order to exclude dust and the like from the tubular members or sheaths, and to insure easy movements for the spokes 9 members 12 are threaded at 13 into the tubular members or sheaths. These members 12 consist of two parts 14 and 15, threaded together as at 16. The parts 14 are threaded into the tubular members or sheaths 4. Located upon the interior of the members 12 and surrounding the rod spokes 9 are clamp rings 17. These clamp rings divide the members 12 into two compartments 18 and 19. In the compartments 18 ball bearings 20 are mounted, while in the compartments 19 packing 21 saturated with lubricating oil is arranged thus acting to exclude all dust or dirt and water from entering the tubular members or sheaths. The ball bearings 20 insure easy movements of the rod spokes 9. The outer ends of the rod spokes 9 are threaded at 22 into the sections 23 of the rim 24 of the wheel. Each section 23 at one end is provided with a pocket or recess 25 to receive the reduced extension plate 26, of one end of the adjacent section. In this manner loose joints are afforded between the sections. The outer faces of the sections are provided with corrugations 27 to prevent the wheel from slipping.

It is to be ascertained from the foregoing that there has been devised a new and useful, simple and practical form of resilient automobile wheel having yieldable means at two points, in conjunction with which the spokes of the wheel act, and one which has been found desirable and practical.

The invention having been set forth, what is claimed as new and useful is:—

1. In a resilient automobile wheel, a hub member having a tubular sleeve or skein, a plate through which the tubular sleeve or skein extends and provided with an annular series of tubular members, said plate having an annular recess, a rubber disk seated in the recess and provided with a series of sockets, said sleeve extending through the disk, a second member threaded upon the sleeve, a metal band or ring surrounding the rubber disk adjacent the inner ends of the tubular member, spokes mounted in the tubular members and passing through the metal band and provided with rubber balls at their inner ends to act in the sockets of the rubber disks, and a sectional rim carried by the outer ends of the spokes.

2. In a resilient automobile wheel, a hub member having a tubular sleeve or skein, a plate through which the tubular sleeve or skein extends and provided with an annular series of tubular members, said plate having an annular recess, a rubber disk seated in the recess and provided with a series of sockets, said sleeve extending through the disk, a second member threaded upon the sleeve, a metal band or ring surrounding the rubber disk adjacent the inner ends of the tubular member, spokes mounted in the tubular members and passing through the metal band and provided with rubber balls at their inner ends to act in the sockets of the rubber disks, and a sectional tire carried by the outer ends of the spokes, said spokes having shoulders, springs mounted in the tubular members and acting between the shoulders and the metal band, and packing devices threaded in the outer portions of the tubular members to exclude the dust and the like therefrom.

3. In a resilient automobile wheel, a hub member having a tubular sleeve or skein, a plate through which the tubular sleeve or skein extends and provided with an annular series of tubular members, said plate having an annular recess, a rubber disk seated in the recess and provided with a series of sockets, said sleeve extending through the disk, a second member threaded upon the sleeve, a metal band or ring surrounding the rubber disk adjacent the inner ends of the tubular member, spokes mounted in the tubular members and passing through the metal band and provided with rubber balls at their inner ends to act in the sockets of the rubber disks, and a sectional rim carried by the outer ends of the spokes, said spokes having shoulders, springs mounted in the tubular members and acting between the shoulders and the metal band, and packing devices threaded in the outer portions of the tubular members to exclude the dust and the like therefrom, said packing devices consisting of two parts threaded together, members in said packing devices dividing the same into two compartments, packing saturated with lubricant located in one compartment, and ball bearings arranged in the other compartments.

In testimony whereof I have signed my name to this specification in the presence of two subscribing witnesses.

WILLIAM A. DAWSON.

Witnesses:
W. E. OBERT,
H. W. CHILES.

Copies of this patent may be obtained for five cents each, by addressing the "Commissioner of Patents, Washington, D. C."